US011828659B2

(12) United States Patent
Baluja

(10) Patent No.: US 11,828,659 B2
(45) Date of Patent: Nov. 28, 2023

(54) TEMPERATURE COMPENSATION FOR MAGNETOSTRICTIVE POSITION DETECTORS

(71) Applicant: ABB Schweiz AG, Baden (CH)

(72) Inventor: Wilfredo Fernando Baluja, Shanghai (CN)

(73) Assignee: ABB Schweiz AG, Baden (CH)

( * ) Notice: Subject to any disclaimer, the term of this patent is extended or adjusted under 35 U.S.C. 154(b) by 161 days.

(21) Appl. No.: 17/071,568

(22) Filed: Oct. 15, 2020

(65) Prior Publication Data

US 2022/0120621 A1 Apr. 21, 2022

(51) Int. Cl.
*G01K 1/20* (2006.01)
*G01F 23/72* (2006.01)
*G01F 25/20* (2022.01)

(52) U.S. Cl.
CPC ............. *G01K 1/20* (2013.01); *G01F 23/72* (2013.01); *G01F 25/20* (2022.01)

(58) Field of Classification Search
None
See application file for complete search history.

(56) References Cited

U.S. PATENT DOCUMENTS

| 4,028,619 A * | 6/1977 | Edwards ............... G01D 5/247 324/207.13 |
| 5,017,867 A * | 5/1991 | Dumais ................ G01B 7/003 324/207.13 |
| 5,076,100 A | 12/1991 | Hunter et al. |
| 5,274,328 A | 12/1993 | Begin et al. |
| 5,406,200 A * | 4/1995 | Begin .................. G01B 7/003 324/207.13 |
| 6,758,408 B2 | 7/2004 | Czimmek |
| 8,402,822 B2 | 3/2013 | Hopper |
| 2015/0098487 A1 | 4/2015 | Wang et al. |

* cited by examiner

*Primary Examiner* — Paul M. West
*Assistant Examiner* — Mark A Shabman
(74) *Attorney, Agent, or Firm* — Leydig, Voit & Mayer, Ltd.

(57) ABSTRACT

A system, method, and apparatus is provided for magnetostrictive position detectors to compensate fluid level measurements for temperature conditions associated with the process without the use of a built-in or external stand-alone temperature sensor. Also disclosed is an algorithm to compensate for temperature conditions associated with the process by determining thermal error coefficients for temperature compensation that are proportional to the process temperature via digital processing of the signals of the position detector.

18 Claims, 3 Drawing Sheets

TEMPERATURE COMPENSATION FOR MAGNETOSTRICTIVE POSITION DETECTORS

BACKGROUND

The present disclosure relates in general to magnetostrictive position detectors, and, more particularly, to compensation of position measurements taken by the magnetostrictive position detector due to temperature changes associated with the environment in which the magnetostrictive position detector is located.

Magnetostrictive position detectors can be used in process control and other applications to measure a position of a movable float, such as to determine a fluid level in a vessel such as a tank. Temperature changes during the process can result in inaccuracy in the position detection of the float, causing inaccuracy fluid level measurements. This is typically resolved by using a temperature sensor built into the detector, or by using a dedicated external temperature sensor to measure the temperature changes, and then determine a temperature compensation error for the position measurement that is based on the measured temperature.

The use of stand-alone temperature sensors to determine the position measurement error and compensation for the same suffers from several drawbacks. For example, costs for the instrumentation are higher due to having to provide separate instruments and/or sensors, in addition to the extra costs for installation, wiring, additional process connections, and additional inputs into the control system. Magnetostrictive position detectors with built-in sensors can alleviate some of these extra costs, but still require the addition of a temperature sensor component to the magnetostrictive position detector. Such detectors may also only provide limited temperature range capabilities. The present disclosure is directed to a system, method, and/or apparatus that provides temperature compensation for magnetostrictive position detector position measurements without requiring the use of temperature sensors.

SUMMARY

In accordance with the present disclosure, a system, method, and/or apparatus is provided for magnetostrictive position detectors to compensate position measurements for temperature conditions without the use of a built-in and/or an external stand-alone temperature sensor. As a result, savings can be realized on the cost of the magnetostrictive position detector and/or in the installation of the magnetostrictive position detector into, for example, a process control system. The present disclosure provides an algorithm to compensate for temperature conditions associated with the environment in which the magnetostrictive position detector is located by determining thermal compensation coefficients that are proportional to the environment temperature via digital processing of the signals of the magnetostrictive position detector. Also provided in accordance with the present disclosure is a computer system that is operable to perform the foregoing.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
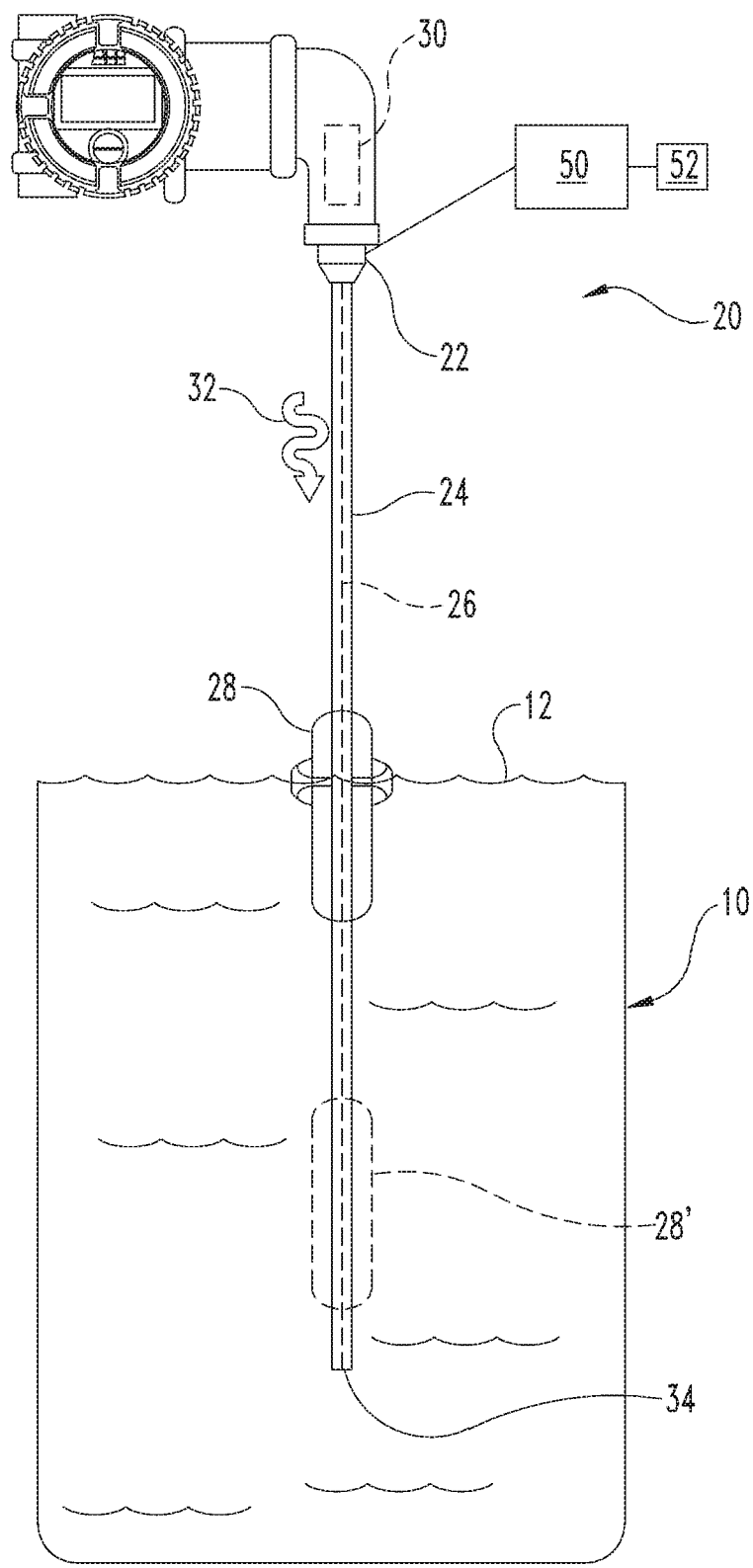
FIG. 1 shows a schematic view of an exemplary system that utilizes a magnetostrictive position detector to determine a position measurement in conjunction with a controller configured to compensation for temperature.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1 there is shown a magnetostrictive position detector 20 for measuring a position 12 in an environment, such as a vessel 10. In one embodiment, position 12 is a liquid level, vessel 10 is a tank or other object containing the liquid, and the environment is a process that involves the liquid in vessel 10. However, the present disclosure has application in determining a position 12 in any application or environment in which the magnetostrictive position detector 20 is employed.

Magnetostrictive position detector 20 includes a sensor 22 connected to a sensor tube or probe 24. Probe 24 contains a sensor wire 26 that is connected to an electronic circuit 30 in the detector 20. A position marker such as a magnetic float 28 is mounted about probe 24 and is movable along the probe 24 in response to a change in level or position 12 of the liquid, as shown by the position of float 28' along probe 24.

In operation, the electronic circuitry 30 in detector 20 generates a low energy current pulse 32 at fixed intervals which travel down wire 26 in probe 24 at the speed of light, which creates a magnetic field around wire 26. The interaction of the magnetic field around wire 26 and the magnet associated with float 28 causes a torsional stress wave to be induced in the wire 26, which propagates along the wire 26 at a known velocity from the float 28 toward the sensor 22. Sensor 22 is configured to convert the received mechanical torsional stress wave into an electronic return pulse. An electronic device, such as computer system 50 is connected to sensor 22, measures the elapsed time between the start and return pulses (time of flight) and converts the measurements into a position measurement of position 12, which is proportional to the level of the float 28 and indicative of the level of the liquid in vessel 10.

Computer system 50 receives input signals from sensor 22 and is configured to output a position determination for float 28 that is compensated for temperature effects. The environmental temperature changes and/or changes in temperature of the liquid creates an inaccuracy in the position measurement obtained by the time of flight determination described above. The computer system 50 may be incorporated into detector 20, or may be a stand-alone device connected to magnetostrictive position detector 20 in any suitable manner, including wired and wireless connections. Computer system 50 may also connected in any suitable way to, or may be part of, a process controller (not shown) that may use the compensated position measurement for position 12 in process control. The computer system 50 and/or process controller may provide the temperature adjusted position measurement determination according to the present disclosure as an alarm, reading, printout, e-mail, text, process variable, signal, etc. without requiring the use of a temperature sensor to determine the temperature compensation. As a result, the functioning of the computer system 50 is improved and the cost of magnetostrictive position detector 20 and/or the associated process hardware is reduced.

The computer system 50 may include one or more computers for performing one or more tasks related to the production process and/or may be dedicated to magnetostrictive position detector 20. At least one of the computers of the computer system 50 may include a user interface devices (UI) 52 that include one or more display devices, such as a monitor (with or without a touch screen) or a hand-held device such as a smart phone, tablet, laptop computer, or other device cell phone for displaying graphics, and one or more entry devices, such as a keyboard, a mouse, a track ball, a joystick, a hand-held device, and/or voice-activated device.

The computer system 50 may be configured to compensate for any one or more temperature error contributors. For example, temperature errors can be contributed to by the material of the probe 24, such as metal, since the material may elongated or contract depending on the direction of the process or environmental temperature change. Temperature errors may also be introduced by changes in density of the process material (liquid) due to temperature fluctuations, which affect the buoyancy of the float 28. The propagation speed of the torsional wave may also be affected by the temperature of the process and/or environment.

These sources of error each have a linear characteristic with respect to temperature change. The computer system 50 is configured to compensate the error introduced by the temperature changes by using a temperature factor without the need for any temperature sensors, resulting in cost reduction of the instruments and the corresponding installations. The computer system 50 is operable to determine the probe length PL as shown in FIG. 2, which remains constant at any given temperature independently of the position of the magnet.

Figure 2:
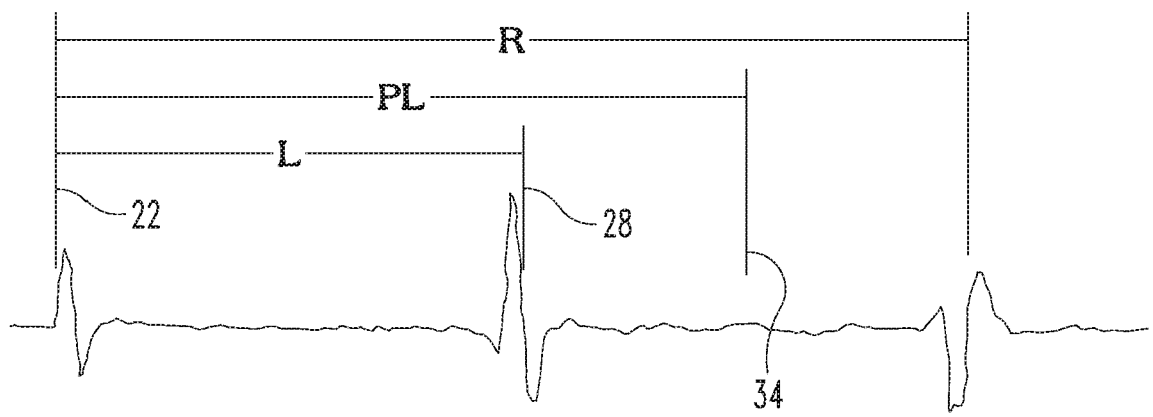
FIG. 2 shows a signal diagram for determining a measured distance to an end of the probe of the magnetostrictive position detector.

In FIG. 2, the distance travelled by the transmitter signal reflected by the magnet of float 28 to the end of the probe 24 and back to the sensor 22 is R, and the distance travelled by the transmitter signal reflected from the magnet of the float 28 back to sensor 22 is L. The measured distance to the end of the probe, also known as the probe length PL, can be determined by averaging L and R as follows:

$$PL=(R+L)/2 \qquad \text{Equation 1}$$

The average times of flight measured for the first reflected signal generated by the magnet of float 28, which travels from the magnet of float 28 to the end 34 of the probe 24 and back to the sensor 22, and the second reflected signal, which travels from the magnet of float 28 to the sensor 22, is equivalent to the time of flight for the length of the probe. Computer system 50 calculates the coefficient of thermal error (CTE) as the ratio between the measured PL and the reference PL ($PL_{REF}$) previously measured at a calibration temperature (such as room temperature), during factory configuration.

$$CTE=PL/PL_{REF} \qquad \text{Equation 2}$$

The coefficient of thermal error can then be applied as an inverse correction factor to the measured position 12 and also to the parameters of the float 28 to compensate for buoyancy errors as follows:

$$L_{COMPENSATED}=L/CTE-H*K/CTE \qquad \text{Equation 3}$$

$L_{COMPENSATED}$ is the compensated position measurement, L is position measurement, H is the immersion height of float 28 at room temperature, and K is a buoyancy coefficient determined by the float design. The parameters H and K can be retrieved by computer system 50 from, for example, one or more lookup tables stored in memory containing the design details of various floats 28, or input directly into computer system 50 if float 28 is a custom designed float.

The calculation of probe length PL can be performed at any given temperature of the environment and at any position of float 28 along the probe 24. In addition, the buoyancy correction factor H*K/CTE can be disabled for applications in which detector 20 is used to measure distance or position and not a liquid level.

Figure 3:
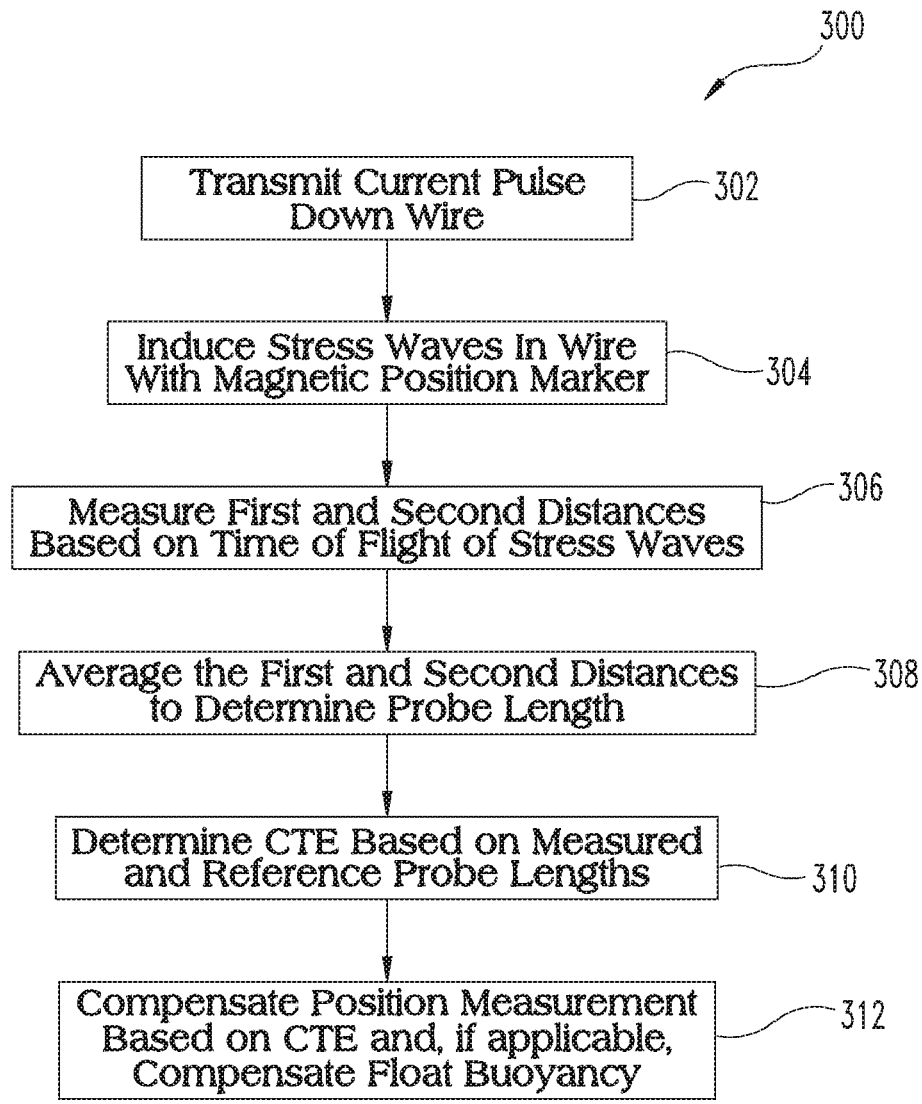
FIG. 3 is a flow diagram of a procedure for compensating for temperature effects on a position measurement by a magnetostrictive position detector.

Referring to FIG. 3, one embodiment of a method for compensating for temperature effects on a position measurement by magnetostrictive position detector 20 is shown. Method 300 includes an operation 302 of transmitting a currently pulse generated by circuitry 30 down wire 26 to the magnetic position marker, such as float 28 in liquid applications.

Method 300 further includes an operation 304 to induce torsional stress waves in wire 26 by the interaction of the current pulse with the magnetic position marker. Method 300 continues at operation 306 to measure first and second distances based on the time of flight of the induced stress waves travelling along the wire 26, which generate reflected signals detected by sensor 22. The first measured distance is measured along a path traveled by a first reflected signal from the magnetic position marker to the end 34 of the probe 24 and from the end 34 of the probe 24 to the sensor 22. The second measured distance is measured along a second path traveled by a second reflected signal from the magnetic position marker back to the sensor 22.

Method 300 continues at operation 308 to average the first and second measured distances to determine a measured probe length for probe 24. Method 300 continues at operation 310 to determine CTE in response to a ratio of the measured probe length to a reference probe length. The reference probe length can be determined in the factor at a predetermined calibration temperature and stored in computer system 50. Method 300 continues at operation 312 to compensate a position measurement for the magnetic positon marker based on the determined CTE.

In environments in which the magnetic position marker is a float to determine a liquid level, the buoyancy error for the float may also be temperature compensated using the CTE. The buoyancy error is a product of an immersion height of the float at room temperature and a buoyancy coefficient of the float divided by the coefficient of thermal error. The immersion height and buoyancy coefficient can be retrieved from look-up tables based on the design of float 28, or entered by the user if float 28 is custom.

The schematic diagrams and procedures described above are generally set forth herein. As such, the depicted order and labeled steps are indicative of representative embodiments. Other steps, orderings, combinations of steps, and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the systems, apparatus, and methods illustrated by the diagrams. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled in order to more particularly emphasize their implementation independence. For example, one or more aspects of detector 20 and/or computer system 50 may be implemented as a hardware circuit comprising custom VLSI circuits or gate arrays, off-the-shelf semiconductors such as logic chips, transistors, or other discrete components. Detector 20 and/or computer system 50 may also be implemented in programmable hardware devices such as field programmable gate arrays, programmable array logic, programmable logic devices or the like.

One or more aspects of detector 20 and/or computer system 50 may also be implemented in machine-readable medium for execution by various types of processors. In some instances, the machine-readable medium for execution by various types of processors may be implemented in the aforementioned hardware circuit. An identified module of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the detector 20 and/or computer system 50.

For example, computer readable program code may be a single instruction, or many instructions, and may even be distributed over several different code segments, among different programs, and across several memory devices. Similarly, operational data such as measurements may be identified and illustrated herein within a module, monitor, or circuit, and may be embodied in any suitable form and organized within any suitable type of data structure. The operational data may be collected as a single data set, or may be distributed over different locations including over different storage devices, and may exist, at least partially, merely as electronic signals on a system or network. Where a module, monitor, or circuit or portions thereof are implemented in machine-readable medium (or computer-readable medium), the computer readable program code may be stored and/or propagated on one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more programming languages, including an object oriented programming language such as Java, Smalltalk, C++ or the like and conventional procedural programming languages, such as the "C" programming language, Python, Matlab, R, or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a controller, computer, other programmable data processing apparatus, or other devices to function in a particular manner, such that the instructions stored in the computer readable medium produce an article of manufacture including instructions which implement the function/act specified herein.

Various aspects of the present disclosure are contemplated as indicated in the claims appended hereto.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of compensating for temperature effects on a position measurement of a position in an environment by a magnetostrictive position detector, the magnetostrictive position detector including a sensor, a probe extending from the sensor wherein the probe has a probe length corresponding to a distance between the sensor and an end of the probe, and a magnetic position marker movable along the probe in correspondence with the position in the environment, the method comprising:
   measuring the probe length using an average of a first measured distance relating to the end of the probe and a second measured distance relating to a location of the magnetic position marker along the probe;
   determining a coefficient of thermal error based on a comparison of the measurement of the probe length and a reference probe length; and
   compensating the position measurement based on the coefficient of thermal error.

2. The method of claim 1, wherein the first measured distance and the second measured distance are determined in response to a time of flight of reflected signals from the magnetic position marker.

3. The method of claim 2, wherein the first measured distance is measured along a path traveled by a first reflected signal from the magnetic position marker to the end of the probe and from the end of the probe to the sensor, and the second measured distance is measured along a second path traveled by a second reflected signal from the magnetic position marker to the sensor.

4. The method of claim 2, wherein the reflected signals are torsional stress waves induced in a wire within the probe, the torsional stress waves being created by a current pulse transmitted by the wire that interacts with the magnetic position marker.

5. The method of claim 1, wherein the reference probe length is determined at a calibration temperature.

6. The method of claim 1, wherein the position in the environment is a fluid level.

7. A computer system operable for compensating for temperature effects on a position measurement of a position in an environment by a magnetostrictive position detector, the magnetostrictive position detector including a sensor, a probe extending from the sensor wherein the probe has a probe length corresponding to a distance between the sensor and an end of the probe, and a magnetic position marker movable along the probe in correspondence with the position in the environment, the computer system operable to:
   measure the probe length using an average of a first measured distance relating to the end of the probe and a second measured distance relating to a location of the magnetic position marker along the probe;
   determine a coefficient of thermal error based on a comparison of the measurement of the probe length and a reference probe length; and
   compensate the position measurement based on the coefficient of thermal error.

8. The computer system of claim 7, wherein the first measured distance and the second measured distance are determined in response to a time of flight of reflected signals from the magnetic position marker.

9. The computer system of claim 8, wherein the first measured distance is measured along a path traveled by a first reflected signal from the magnetic position marker to the end of the probe and from the end of the probe to the sensor, and the second measured distance is measured along a second path traveled by a second reflected signal from the magnetic position marker to the sensor.

10. The computer system of claim 8, wherein the reflected signals are torsional stress waves induced in a wire within the probe, the torsional stress waves being created by a current pulse transmitted by the wire that interacts with the magnetic position marker.

11. The computer system of claim 7, wherein the reference probe length is factory calibrated.

12. The computer system of claim 7, wherein the magnetic position marker is a float and the computer system is operable to compensate the position measurement for a buoyancy error of the float.

13. The computer system of claim 12, wherein the buoyancy error is a product of an immersion height of the float at room temperature and a buoyancy coefficient of the float divided by the coefficient of thermal error.

14. The computer system of claim 13, wherein the computer system is part of the magnetostrictive position detector or connected to the magnetostrictive position detector.

15. The computer system of claim 7, wherein the position measurement is a fluid level.

16. A method of compensating for temperature effects on a position measurement of a fluid level by a magnetostrictive position detector, the magnetostrictive position detector including a sensor, a probe extending from the sensor, and a float movable along the probe in correspondence with the fluid level, the method comprising:

determining a coefficient of thermal error in response to a measured probe length and a reference probe length; and compensating the position measurement for a buoyancy error of the float with the coefficient of thermal error.

17. The method of claim 16, wherein the buoyancy error is a product of an immersion height of the float at room temperature and a buoyancy coefficient of the float divided by the coefficient of thermal error.

18. The method of claim 17, wherein the immersion height and buoyancy coefficient are retrieved from look-up tables.

* * * * *